US012017253B2

(12) United States Patent
Chomette et al.

(10) Patent No.: US 12,017,253 B2
(45) Date of Patent: Jun. 25, 2024

(54) DEVICE FOR USING A PRODUCT FOR ABSORBING SPILLED FLUIDS, INCLUDING RECYCLING OF SAID PRODUCT

(71) Applicant: SRI FRANCE, Pierre Benite (FR)

(72) Inventors: Bertrand Chomette, Saint Etienne (FR); Frédéric Mathieu, Francheville (FR)

(73) Assignee: SRI FRANCE, Pierre Benite (FR)

( * ) Notice: Subject to any disclaimer, the term of this patent is extended or adjusted under 35 U.S.C. 154(b) by 72 days.

(21) Appl. No.: 17/611,976

(22) PCT Filed: May 5, 2020

(86) PCT No.: PCT/FR2020/050745
§ 371 (c)(1),
(2) Date: Nov. 17, 2021

(87) PCT Pub. No.: WO2020/234522
PCT Pub. Date: Nov. 26, 2020

(65) Prior Publication Data
US 2022/0250119 A1    Aug. 11, 2022

(30) Foreign Application Priority Data

May 17, 2019   (FR) ...................................... 19/05179

(51) Int. Cl.
*B07B 1/00*   (2006.01)
*B07B 13/16*   (2006.01)
*B09C 1/00*   (2006.01)

(52) U.S. Cl.
CPC .............. *B07B 1/005* (2013.01); *B07B 13/16* (2013.01); *B09C 1/00* (2013.01)

(58) Field of Classification Search
CPC .. B07B 1/005; B07B 1/02; B07B 1/28; B07B 13/16; B09C 1/00
See application file for complete search history.

(56) References Cited

U.S. PATENT DOCUMENTS

| 5,785,000 A * | 7/1998 | Barbary ............... A01K 1/0114 |
| | | 119/166 |
| 2011/0315084 A1* | 12/2011 | Miller .................. A01K 1/0114 |
| | | 119/166 |

(Continued)

FOREIGN PATENT DOCUMENTS

| CA | 2919640 A1 | 8/2016 |
| CN | 106595243 A * | 4/2017 |

(Continued)

OTHER PUBLICATIONS

International Search Report dated Sep. 15, 2020 re: Application No. PCT/FR2020/050745, pp. 1-3.

*Primary Examiner* — Joseph C Rodriguez
(74) *Attorney, Agent, or Firm* — CANTOR COLBURN LLP

(57) ABSTRACT

A device for using a powder or granular product for absorbing fluids spilled on the floor or ground includes a container provided with a storage tank for storing the absorbent product, a tank for receiving the soiled absorbent product, and a sifting receptacle. The sifting receptacle includes, at the bottom, a strainer which is arranged above an opening in the storage tank and can be emptied into the receiving tank.

7 Claims, 4 Drawing Sheets

(56) References Cited

U.S. PATENT DOCUMENTS

2016/0295828 A1* 10/2016 Fenwick .............. A01K 1/0107
2016/0325314 A1   11/2016 Harpel

FOREIGN PATENT DOCUMENTS

| GB | 268657 A  | 4/1927 |
| GB | 588039 A  | 5/1947 |
| GB | 2346077 A | 8/2000 |

* cited by examiner

[Fig. 1]
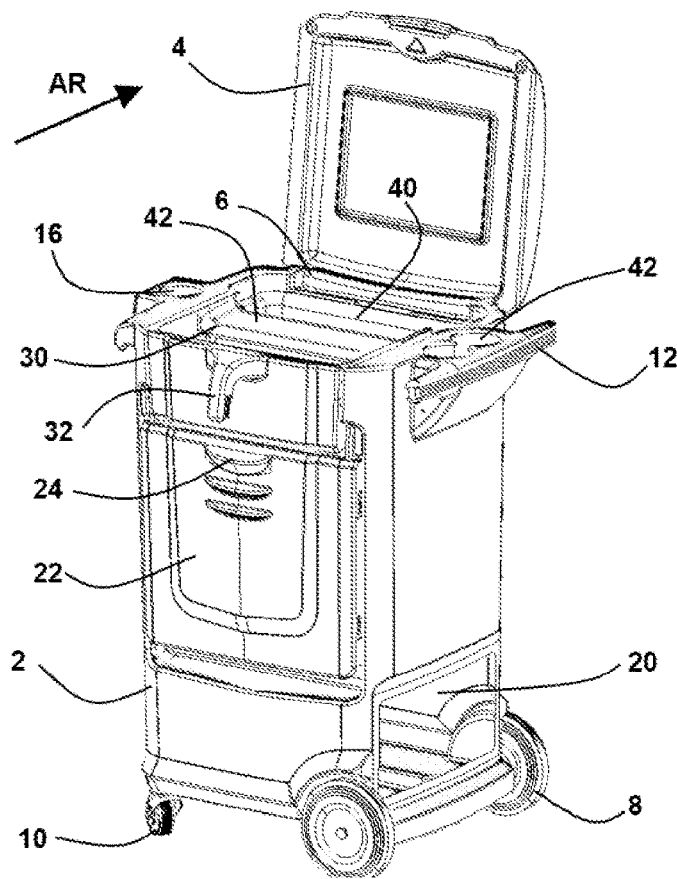
[Fig. 2]
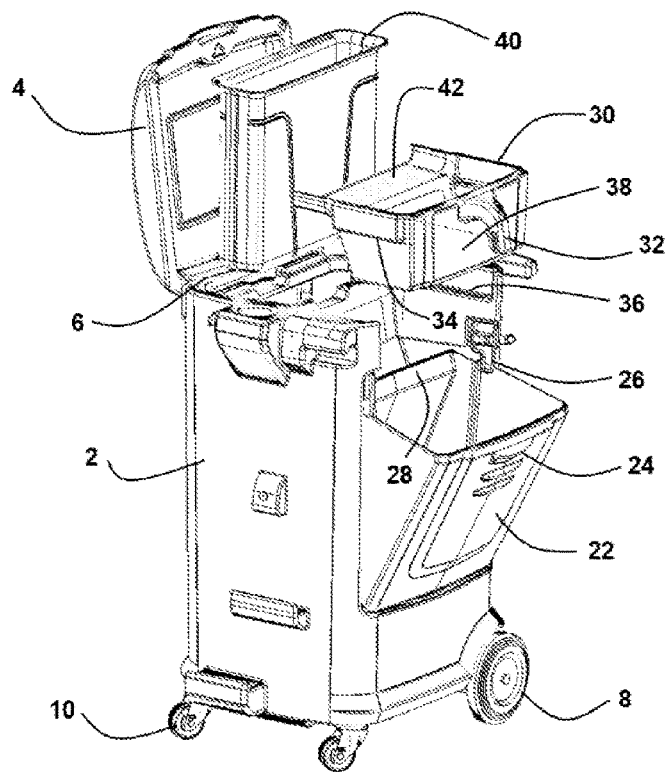

[Fig. 3]
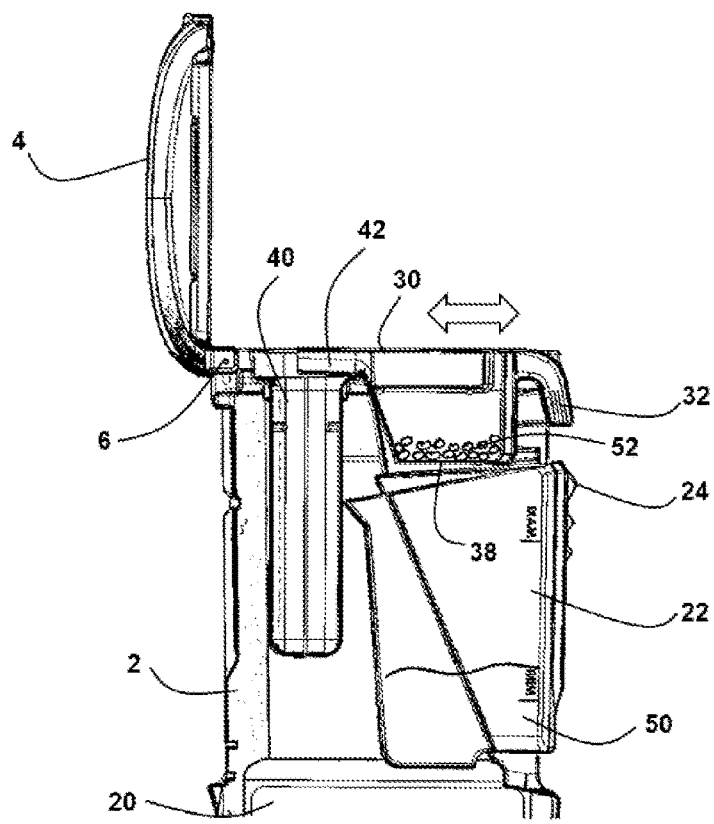
[Fig. 4]
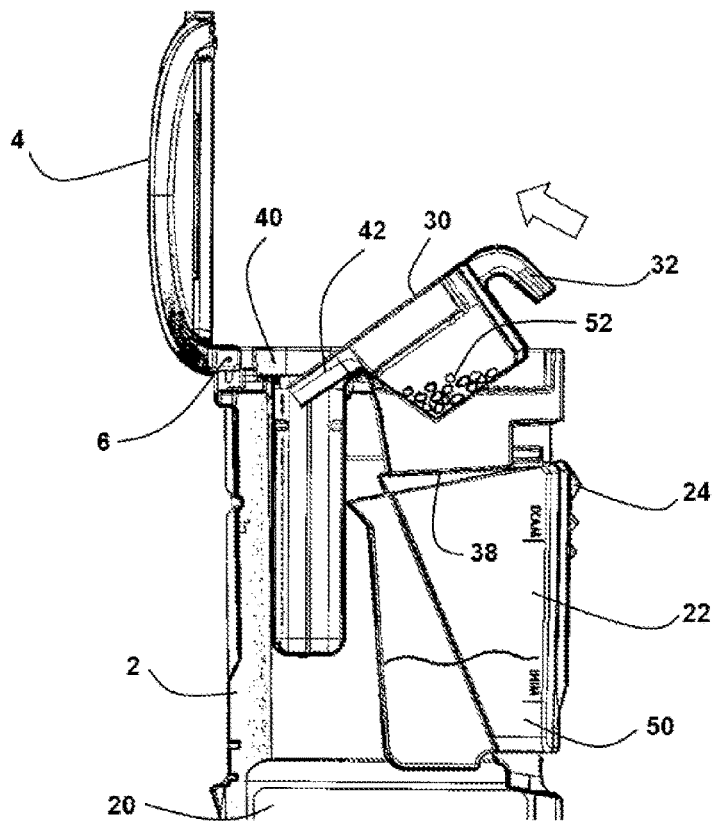

[Fig. 5]
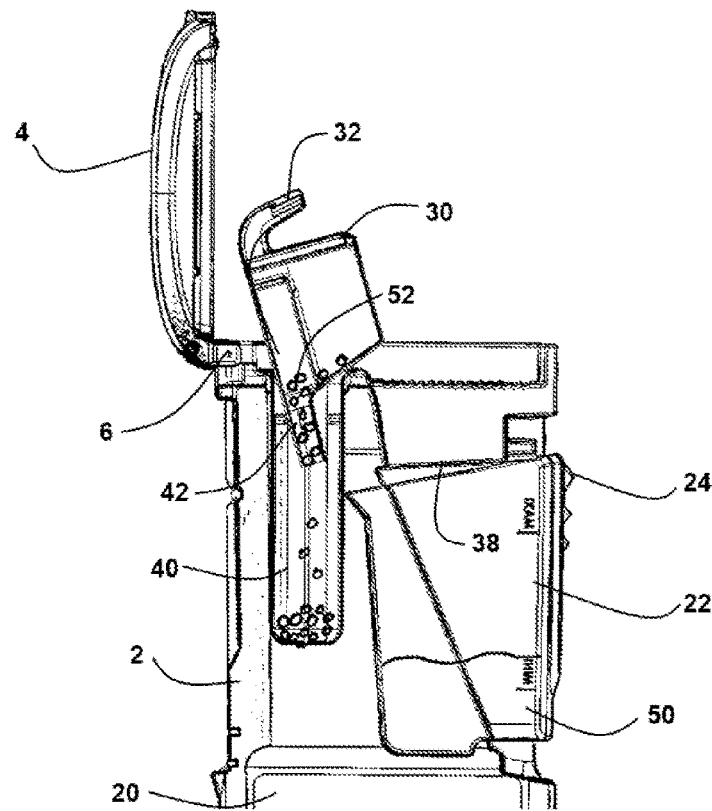
[Fig. 6]
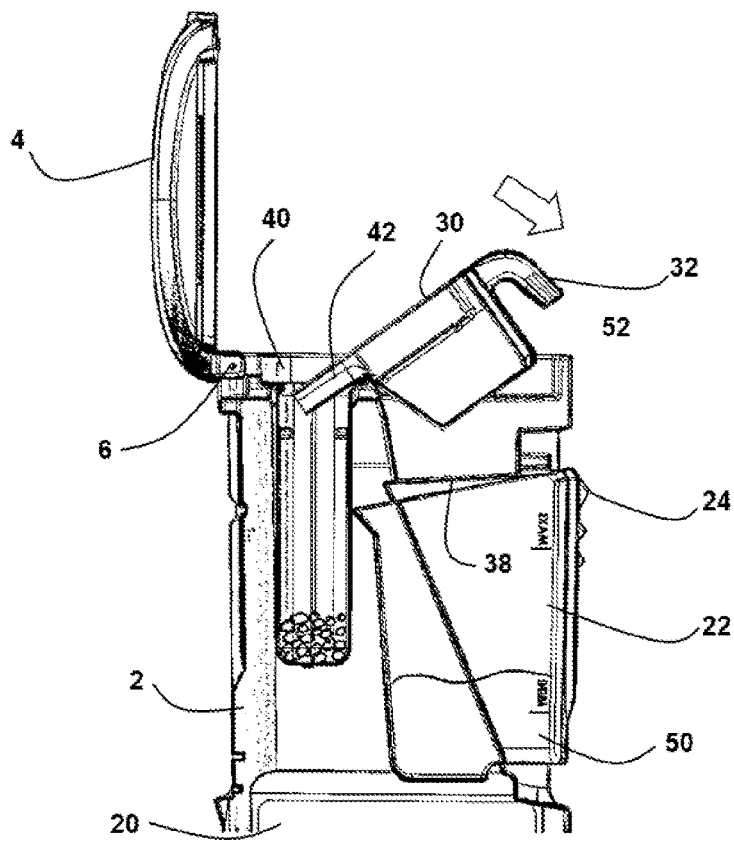

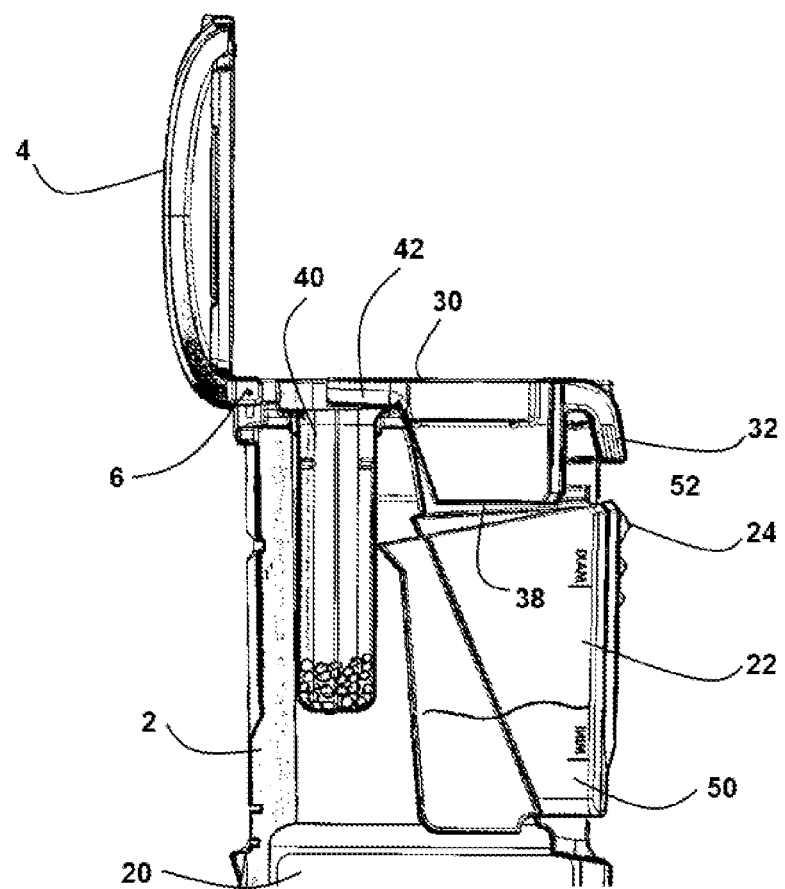
[Fig. 7]

DEVICE FOR USING A PRODUCT FOR ABSORBING SPILLED FLUIDS, INCLUDING RECYCLING OF SAID PRODUCT

TECHNICAL FIELD

The present disclosure concerns a device for using an absorbent product in powder or granules, as well as a method for implementing such a device.

BACKGROUND

After the flow of a fluid on a floor, in particular chemical products, hydrocarbons or oils, it is known to use an absorbent product in the form of powder or granules, which is spread over the stains in order to absorb this fluid at a first time.

The absorbent product swollen by the fluid is then collected, for example by sweeping, in order to remove the major part of the fluid spread on the ground. Finally, if necessary, a solvent or a cleaning product such as washing powder can be applied to the floor in order to ensure the cleanliness of this floor.

For these various operations it is known to use trolleys equipped with all the necessary elements, including a storage tank containing the absorbent product, a receiving tank receiving the soiled absorbent product, and the various tools necessary to carry out these operations such as a broom and scoop.

In this way, the cleaning staff can be displaced quickly on the site of the incident to first recover the fluid spilled with the absorbent product as much as possible, then collect and throw this soiled product into the receiving tank. Once the receiving tank is full, the soiled product can be recovered and processed by specialized companies under the best conditions of safety and respect for the environment.

It should be noted that some spread products can present risks, such as chemical products giving off toxic vapors, greasy and slippery products that can cause accidents, or products which end up impregnating the soil and polluting them. The staff must be able to intervene quickly to carry out the collection in an efficient and complete manner.

In order to optimize the qualities of the used absorbent product, certain suppliers have developed powders or granules having a high absorption power, in particular based on cellulose fibers, in order to quickly and safely recover a maximum of spread fluid.

Nonetheless, all of the absorbent product spread on the ground is then thrown into the recovery tank, which results in a significant consumption of product, which can have a high cost, and generates a mass of waste which also entails costs for its disposal.

SUMMARY

The present disclosure presents and apparatus and a device that avoids these drawbacks of the prior art.

For this purpose, it proposes a device for using an absorbent product, in particular in powder or granules, to absorb fluids spread on the ground, comprising a container equipped with a storage tank of this absorbent product, and a receiving tank of the soiled absorbent product, this device being remarkable in that it includes a sieving receptacle comprising at the bottom a sieve arranged above an opening of the storage tank, can be emptied into the receiving tank.

An advantage of the device according to the disclosure is that after spreading the absorbent product on the ground, the operator simply pours this soiled product into the receptacle equipped with the sieve, and then with a vibration obtain a sieve of this product allowing the product to pass through the non-soiled powder or granules remaining in the form of fine particles, which descend and are recycled in the storage tank. Once this sieving is finished, the operator tilts the receptacle to pour into the receiving tank the product remaining effectively soiled, which has agglomerated, forming lumps.

There is thus obtained both a maximum recovery of the non-soiled absorbent product, which is ready to be used for subsequent operations, and a minimum elimination of waste which is effectively soiled.

The device for using the absorbent product according to the disclosure may also include one or more of the following characteristics, which can be combined with one another.

Advantageously, the opening of the storage tank corresponds to the external contour of this storage tank.

Advantageously, the sieving receptacle includes a guide in the container.

In this case, the sieving receptacle may include external shoulders which come above bosses formed inside the container.

Advantageously, the sieving receptacle includes a handle arranged on a front face of the container, the guide in the container taking place in a direction perpendicular to this front face.

Advantageously, the receiving tank is placed next to the sieving receptacle.

In this case, the sieving receptacle advantageously includes on the upper part of one of its sides a horizontal chute whose end comes above the receiving tank.

In addition, the sieving receptacle advantageously includes a form which comes to bear on an edge of the receiving tank, constituting a pivot allowing the chute to be poured into this receiving tank.

Advantageously, the sieving receptacle includes at the bottom a sieve having embossments.

The subject of the disclosure is also a method for implementing a device for using an absorbent product, in particular in powder or granules, according to any one of the preceding characteristics, including an operation of shaking the sieving receptacle following guides above the storage tank, then a tilting operation of the sieving receptacle emptying lumps formed by the soiled product in the receiving tank, and finally an operation of putting the sieving receptacle back in position above the storage tank.

BRIEF DESCRIPTION OF THE DRAWINGS

The disclosure will be better understood and other characteristics and advantages will emerge more clearly on reading the description below given by way of example, with reference to the appended drawings in which:

FIG. 1 shows a using device according to the disclosure comprising the open top cover;

FIG. 2 presents this using device comprising the various tanks which have come out;

FIG. 3 presents this using device in section along a vertical median plane, during the recycling of the absorbent product, during a first sieving operation;

FIG. 4 presents this using device during a second sieving end operation;

FIG. 5 presents this using device during a third operation of dumping the lumps;

FIG. 6 presents this using device during a fourth tilting operation of the sieving receptacle; and FIG. 7 presents this using device during a fifth operation of replacing the sieving receptacle.

DETAILED DESCRIPTION OF THE DRAWINGS

FIGS. 1 and 2 show a trolley comprising a container 2 including a vertically elongated parallelepiped shape, having a cover 4 fixed by a hinge 6 at the top of the rear side of this container indicated by the arrow AR.

By looking at the front face of the container 2, arranged in a direction called the width of the container, the base on the right side includes an axis arranged along the length receiving two fixed wheels 8, and the base on the left side has at each angle a following swivel wheel a vertical axis 10 to ensure the mobility of the trolley in all directions.

An upper handle 12 fixed at the top of the right side, connected to the container 2 by two cells 14 which can receive bottles or small objects, makes it possible to easily displace the trolley even with a large load placed inside. The left side of the container 2 includes in the upper part a cell 16 also allowing bottles to be housed therein.

The right side includes in the lower part an opening 20 opening onto a lower compartment occupying about a quarter of the height of the container 2, making it possible to house various products therein.

The front face of the container 2 is fully open above the lower compartment. A storage tank 22 for an absorbent product in powder or granules, includes a front face fitted to the front face of the container, sides fitted inside the right and left sides of the container, and a rear face disposed approximately at the two thirds of the length of this container. The upper opening of the storage tank 22, formed along the complete external contour of this tank, reaches approximately three quarters of the height of the container 2.

The storage tank 22 is connected to the container 2 by a lower pivot arranged along the width allowing it to tilt forward as shown in FIG. 2, a handle 24 formed on the upper part of its front face facilitating this traction.

Each side of the container 2 includes on its internal face a stopper 26 which descends slightly inside the storage container 22, coming on an internal shoulder of the container when it is fully tilted forward in order to avoid a fall of the tank. In this way, the storage tank 22 can easily be opened by pulling it by its handle 24, to release its upper opening forward and fill it.

A sieving receptacle 30 has a substantially rectangular shape fitting in the width of the container 2, having a forward facing handle 32 which facilitates its gripping and its movement.

The sieving receptacle 30 includes on each side along its length a horizontal external shoulder 34, forming an overhang which rests on a corresponding boss 36 formed inside the right and left side of the container 2, to constitute guide rails along the length of this container comprising stops at the ends.

The sieving receptacle 30 includes a horizontal bottom forming a lower sieve 38, having a passage surface which remains inside the opening of the storage tank 22 during movements using the handle 32 of this receptacle, limited by its stops, to be ensured that all of the absorbent product passing through the sieve falls into this tank. The sieve 38 has a generally flat horizontal surface comprising embossments distributed over this surface.

A tank for receiving the soiled absorbent product 40 having a parallelepiped shape elongated in height, includes a width which fits inside the two sides of the container 2, a length corresponding to approximately a quarter of the length of this container, and a height corresponding to approximately half of the height of the container.

The rear upper edge of the storage tank 22 includes a spoiler 28 facing the rear, which bears on the front face of the receiving tank 40 in order to completely close the passage between these two tanks to prevent descents of absorbent product which would fall between them, outside the storage tank.

The sieving receptacle 30 includes in the upper part of its rear face a horizontal chute 42 extending over the entire width of this rear face, which ends substantially in the middle of the receiving tank 40. The receiving tank 40 and the sieving receptacle 30 are easily removed by lifting them out of the container 2.

All of the components of the trolley, comprising in particular the container 2 formed of several assembled panels each constituting one side, the cover 4, the storage tank 22, the sieving receptacle 30 with its sieve 38 and the receiving tank 40, are formed by a plastic molding which makes it possible to economically produce rigid and light elements.

Advantageously, the operator has on the trolley containing the absorbent product in the storage tank 22, a broom, a scoop, cleaning product and accessories such as rags, so that during an intervention, all the necessary equipment is available to pick up spread fluid and clean the floor.

FIG. 3 shows after the removal of the clean absorbent product 50 in the storage tank 22 and its spread on the fluid spread on the ground, and after an absorption time allowing the fibers of this product to recover a maximum of fluid, the collection with a broom and a scoop of the soiled product comprising lumps 52 which is poured into the sieving receptacle 30.

In a following operation the operator grasps the handle 32 of the sieving receptacle 30, and applies a vigorous reciprocating movement along the length by sliding it on its rails to obtain a descent through the sieve 38 of the absorbent product 50 which has not be in contact with the fluid, remaining in the form of powder or granules fine enough not to pass through the sieve.

The embossing of the sieve 38 facilitates the movement and sorting of the absorbent product, by rolling the lumps 52 formed by the powder or granules agglomerated by the absorbed fluid, and by clearing the mesh of the sieve to pass the clean product.

FIG. 4 shows a following operation carried out when the operator observes that all of the clean absorbent product 50 has descended into the storage tank 22.

The operator lifts the handle 32 by tilting the sieving receptacle 30 about a pivot formed by the junction of the chute 42 with the rear face of the sieving receptacle 30, rotating around the upper front edge of the receiving tank 40. In this way, the sieving receptacle 30 is guided by letting the rear end of its chute 42 descend into the receiving tank 40.

FIG. 5 shows a following operation comprising the complete tilting of the sieving receptacle 30, coming into a substantially vertical position, all of the lumps 52 descending into the receiving tank 40.

FIG. 6 shows a following operation comprising the reverse tilting of the receptacle sieve 30 which is empty.

FIG. 7 shows a following operation comprising the reinstallation of the sieving receptacle 30 in its housing at the top of the container 2. The trolley is ready for a following operation as long as there is still clean absorbent product 50 in the storage tank 22 and space in the receiving tank 40.

A subsequent operation of emptying the receiving tank 40 is easily done by lifting the sieving receptacle 30, and the receiving tank 40 which slides vertically to be emptied. Another subsequent operation of filling the storage tank 22 is easily done by pulling its handle 24 to tilt it forward, which releases its upper opening allowing it to be filled, for example with a scoop, or by emptying a bag therein.

The invention claimed is:

1. A device for using an absorbent product to absorb fluids spread on the ground, the device comprising: a container equipped with a storage tank of the absorbent product, and a receiving tank of the soiled absorbent product, wherein the device includes a sieving receptacle comprising at the bottom a sieve disposed above an opening of the storage tank, which is configured to be emptied into the receiving tank, wherein the sieving receptacle includes a guide formed by external shoulders which come above corresponding bosses formed inside the container.

2. The using device according to claim 1, wherein the opening of the storage tank corresponds to the complete external contour of this storage tank.

3. The using device according to claim 1, wherein the sieving receptacle includes a handle arranged on a front face of the container, the guide in the container taking place in a direction perpendicular to this front face.

4. The using device according to claim 1, wherein the receiving tank is arranged next to the sieving receptacle.

5. The using device according to claim 4, wherein the sieving receptacle comprises sides, and includes on the upper part of one of its the sides a horizontal chute whose end comes above the receiving tank.

6. The using device according to claim 5, wherein the sieving receptacle includes a form bearing on an edge of the receiving tank, constituting a pivot allowing to pour the chute in this receiving tank.

7. A method for implementing a device for using an absorbent product, in powder or granules, according to claim 1, wherein the method includes an operation of shaking the sieving receptacle following guides above the storage tank, then a tilting operation of the sieving receptacle emptying lumps formed by the soiled product in the receiving tank, and finally an operation of putting the sieving receptacle back in position above the storage tank.

* * * * *